United States Patent
Lee (10) Patent No.: US 9,025,089 B2
(45) Date of Patent: May 5, 2015

(54) TOUCH PANEL DEVICE

(75) Inventor: Ho-Jin Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 309 days.

(21) Appl. No.: 12/948,211

(22) Filed: Nov. 17, 2010

(65) Prior Publication Data

US 2011/0115340 A1    May 19, 2011

(30) Foreign Application Priority Data

Nov. 17, 2009    (KR) .................. 10-2009-0110996

(51) Int. Cl.
    *G02F 1/1335*    (2006.01)
    *G02F 1/1333*    (2006.01)
    *G06F 3/041*    (2006.01)
    *G06F 3/01*    (2006.01)

(52) U.S. Cl.
    CPC .............. *G06F 3/041* (2013.01); *G06F 3/016* (2013.01)

(58) Field of Classification Search
    CPC ........ G06F 3/041; G06F 3/0414; G06F 3/016
    USPC ................. 349/12, 58; 345/173–178
    See application file for complete search history.

(56) References Cited

U.S. PATENT DOCUMENTS

| | | | |
|---|---|---|---|
| 2010/0156814 A1* | 6/2010 | Weber et al. ................. | 345/173 |
| 2010/0156844 A1* | 6/2010 | Paleczny et al. ............. | 345/174 |
| 2010/0328230 A1* | 12/2010 | Faubert et al. ............... | 345/173 |
| 2011/0032091 A1* | 2/2011 | Park et al. ................... | 340/407.2 |

\* cited by examiner

*Primary Examiner* — Nathanael R Briggs
(74) *Attorney, Agent, or Firm* — The Farrell Law Firm, P.C.

(57) ABSTRACT

A touch panel device in which a support portion is provided to include an actuator for generating vibration giving an excellent sense of touch without the need for a separate mounting space. To this end, the touch panel device having a front cover portion, a touch sensor unit divided into an upper transparent electrode layer and a lower transparent electrode layer, and a substrate provided under the touch sensor portion includes an actuator for delivering vibration to the front cover portion, a reinforcing portion having the actuator attached thereto to attach the actuator to the touch sensor unit, and a support portion formed on the substrate to provide an opening in a first side thereof and a closed second side, such that the actuator is inserted into and coupled to the opening and the support portion supports the actuator to deliver the vibration of the actuator to the front cover portion.

11 Claims, 10 Drawing Sheets

TOUCH PANEL DEVICE

PRIORITY

This application claims priority under 35 U.S.C. §119(a) to a Korean Patent Application filed in the Korean Intellectual Property Office on Nov. 17, 2009 and assigned Serial No. 2009-110996, the entire disclosure of which is hereby incorporated by reference.

BACKGROUND OF THE INVENTION

1. Field of the Invention

The present invention generally relates to a touch panel device, and in particular, to a touch panel device in which a support portion is provided to include an actuator for generating vibration giving an excellent sense of touch without the need for a separate mounting space.

2. Description of the Related Art

Generally, a touch panel device is a means for inputting information to a computer and is used together with various display forms including a cathode ray tube (CRT) and a Liquid Crystal Display (LCD). When disposed on a display unit, a touch panel device allows a user to select a displayed icon or element by triggering the user to touch a position of the touch panel corresponding to the icon or element.

Recently, with the remarkable development of multimedia technology and display technology, the resolution of a display unit of a portable communication device has been improved, increasing the utilization of touch panel devices for portable communication devices.

Since the touch panel device, and in particular a touch sensor unit of a general resistance type, can provide position information by a touch as an input only when equipped with two sensor units, a film has to be attached onto a window included in the portable communication device. However, a touch sensor unit of a capacitance type used widely in recent years provides position information about a point from which an electric charge leaks at the time of a touch.

Figure 1:
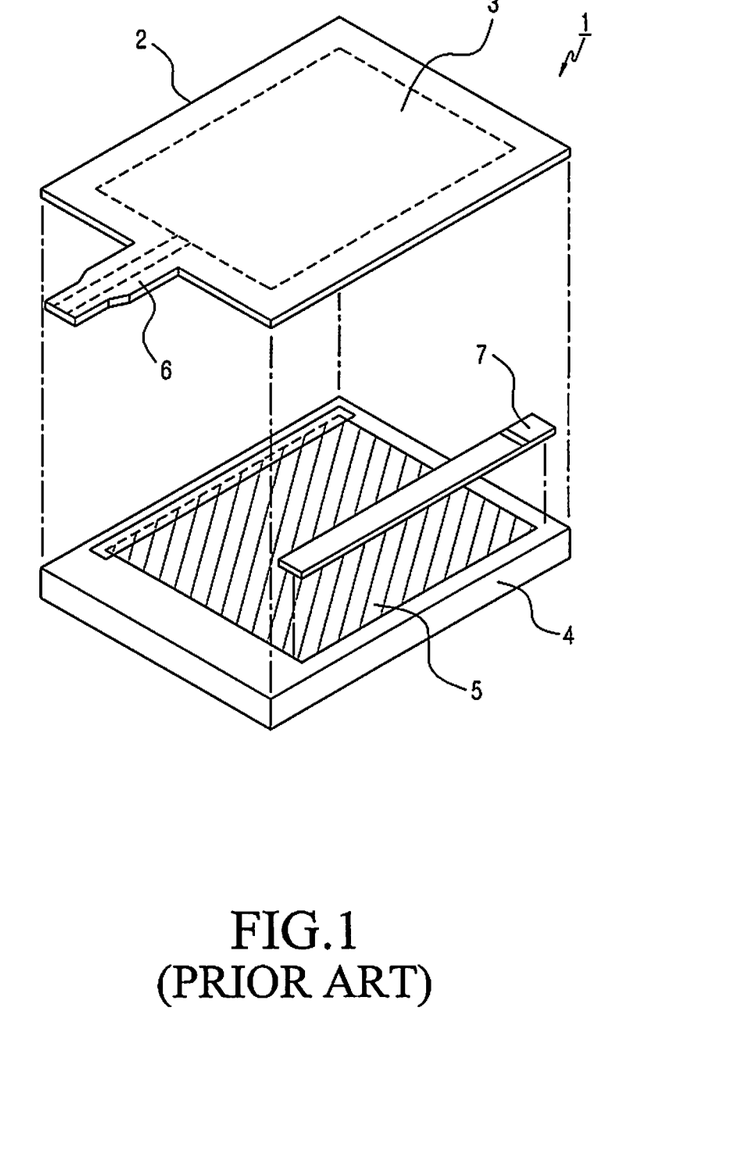
FIG. 1 is an exploded perspective view of a conventional touch panel device.
Figure 2:
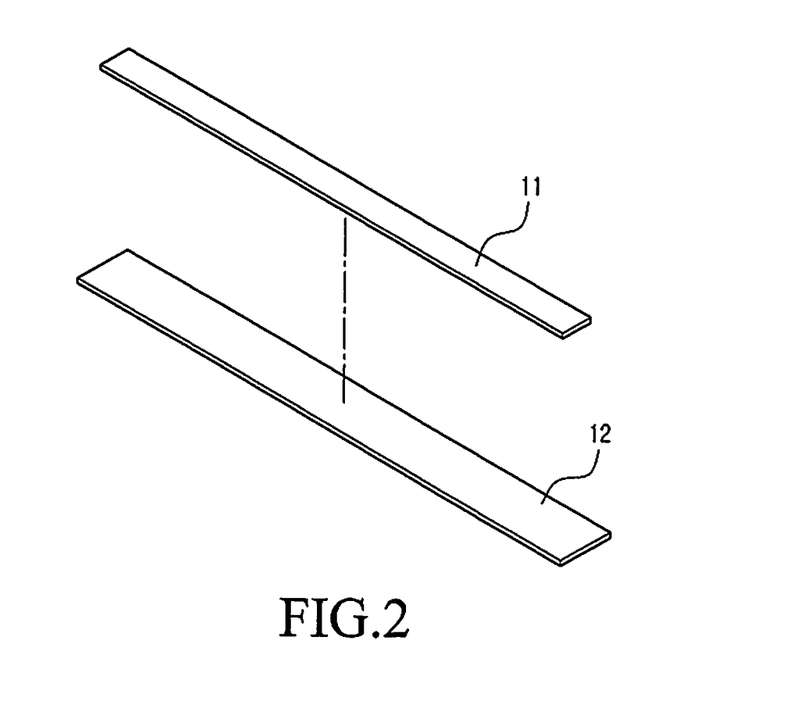
FIG. 2 is an exploded perspective view of an actuator and a reinforcing portion of a touch panel device according to a first embodiment of the present invention.
Figure 3:
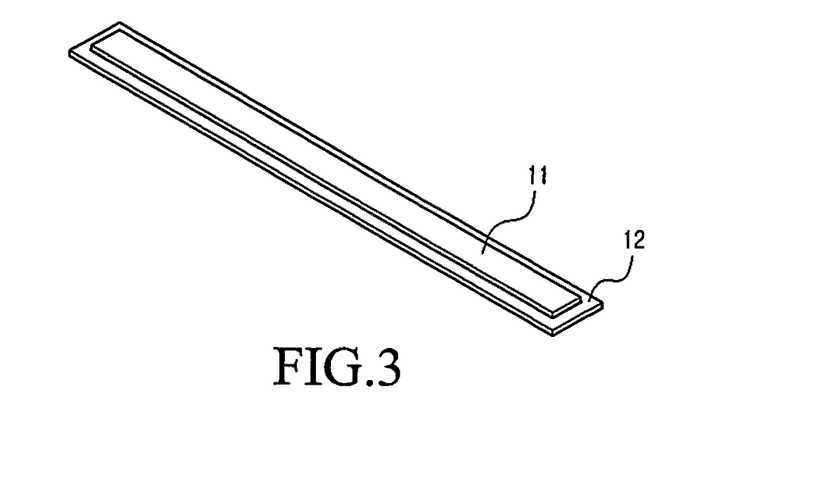
FIG. 3 is a perspective view showing a state where the actuator and the reinforcing portion are attached to each other.

As shown in FIG. 1, a touch panel device 1 includes a front cover portion 2, a film-type touch sensor unit 3 provided on a bottom surface of the front cover portion 2, and a substrate 4 having a display unit 5 provided under the touch sensor unit 3.

The touch sensor unit 3 includes upper and lower transparent electrode layers and a cable 6 for electrically connecting the electrode layers with an external circuit.

The front cover portion 2 includes a transparent window, and materials of the transparent window and the substrate 4 may be glass or acryl.

However, since simple touches of the transparent window of the portable communication device have proven to be unsatisfactory, users have demanded an interface which is more natural, easy to use and useful.

Consequently, a "haptic" function has been added to the portable communication device.

The term "haptic" refers to a tactile sense a user can experience with a fingertip or a stylus pen when touching an object. This concept includes a tactile feedback sensed when the skin contacts the object's surface and a kinesthetic force feedback sensed when articular and muscular movements are disturbed.

As a device for providing a haptic function, there is a device having an actuator mounted under a touch panel device. As the actuator is driven, the driving of the actuator is delivered to the touch panel device fixedly connected with the actuator, allowing a user to perceive the driving.

However, to mount the actuator providing the haptic function on the portable communication device using the conventional touch panel device, a separate space is required as shown in FIG. 1, and to this end, a spacer 7 has to be inserted between the touch sensor unit 3 and the display unit 5, increasing the overall thickness of the portable communication device and thus hindering slimness and compactness of the portable communication device.

Moreover, the conventional actuator requires a particular space and a particular size to be driven. As a result, when the touch sensor unit 3 and the display unit 5 are mounted together, the mounting space therefor degrades the visibility of the display unit 5.

Accordingly, there is a need for a touch panel device for a portable communication device, which allows an actuator with an excellent sense of touch to be mounted without the need for a separate mounting space.

SUMMARY OF THE INVENTION

An aspect of the present invention is to address at least the above problems and/or disadvantages and to provide at least the advantages described below. Accordingly, an aspect of the present invention is to provide a touch panel device in which a support portion is provided to include an actuator for generating vibration with an excellent sense of touch without the need for a separate mounting space, thereby improving both a sense of touch of a product and a haptic function.

Moreover, another aspect of the present invention is to provide a touch panel device in which an actuator for generating vibration with an excellent sense of touch is provided in a support portion opened forward without the need for a separate mounting space, thereby delivering the vibration of the actuator towards a front surface of a product and preventing the vibration from being delivered towards a rear surface of the product.

Furthermore, another aspect of the present invention is to provide a touch panel device in which an actuator for generating vibration with an excellent sense of touch is provided in a support portion opened forward to be coupled by insertion without the need for a separate mounting space, thereby achieving slimness and compactness of a product through reduction of the overall thickness of the product and improving the impact-resistance strength of the actuator.

According to an aspect of the present invention, there is provided a touch panel device including a front cover portion, a touch sensor unit divided into an upper transparent electrode layer and a lower transparent electrode layer, and a substrate provided under the touch sensor portion. The touch panel device includes an actuator for delivering vibration to the front cover portion, a reinforcing portion having the actuator attached thereto to attach the actuator to the touch sensor unit, and a support portion formed on the substrate to provide an opening in a first side thereof and a closed second side, such that the actuator is insertedly coupled to the opening and the support portion supports the actuator to deliver the vibration of the actuator to the front cover portion.

According to another aspect of the present invention, there is provided a touch panel device including a front cover portion, a touch sensor unit divided into an upper transparent electrode layer and a lower transparent electrode layer, and a substrate provided under the touch sensor portion. The touch panel device includes an actuator attached to a bottom surface of the touch sensor unit to deliver vibration to the front cover portion and a support portion formed on the substrate to provide an opening in a first side thereof and a closed second side, such that the actuator is insertedly coupled to the opening and the support portion supports the actuator to deliver the vibration of the actuator to the front cover portion.

BRIEF DESCRIPTION OF THE DRAWINGS

The above and other features and advantages of exemplary embodiments of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described in detail with reference to the accompanying drawings. It should be understood that the embodiments described herein and structures shown in the drawings are merely illustrative and various modifications which can substitute for the embodiments and structures can be made by one skilled in the art.

Figure 4:
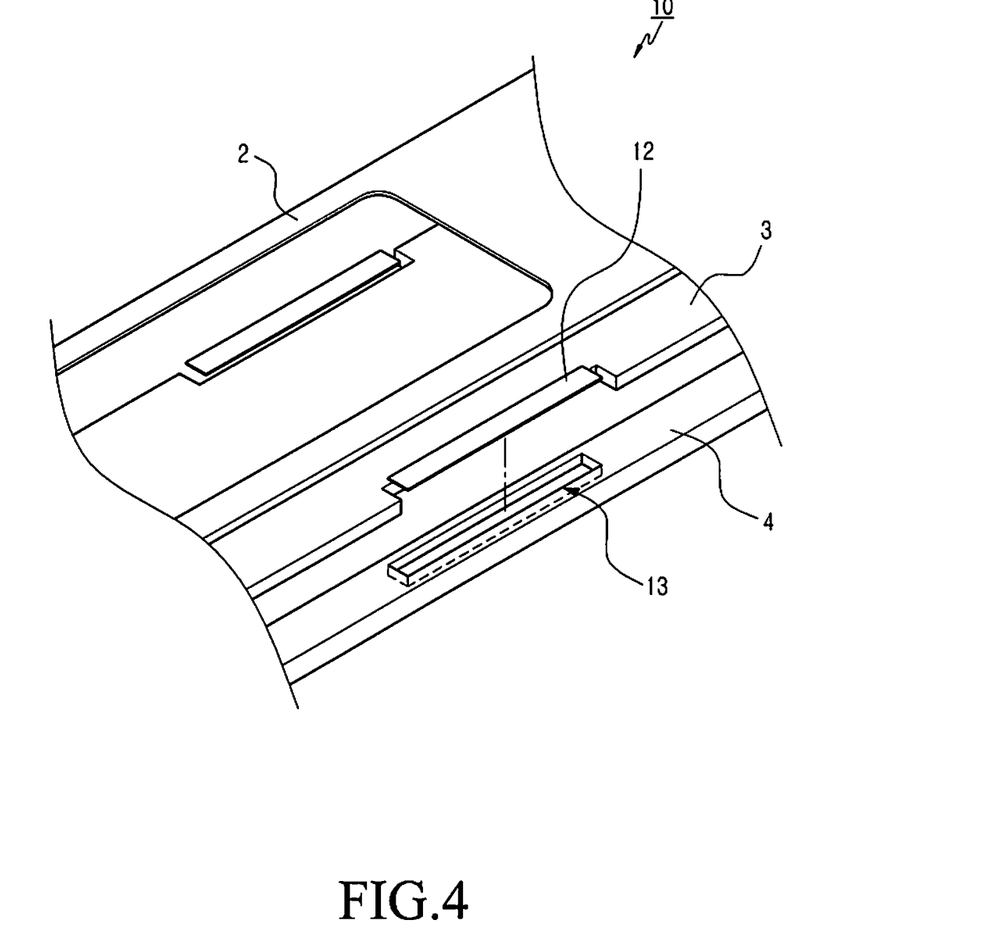
FIG. 4 is an exploded perspective view of the touch panel device according to the first embodiment of the present invention.

As shown in FIGS. 2 through 8, and with reference to FIG. 4, a touch panel device 10 includes a front cover portion 2, a touch sensor unit 3 divided into an upper transparent electrode layer 3a and a lower transparent electrode layer 3b (FIGS. 7 and 8), a substrate 4 including a display unit (not shown), an actuator 11, a reinforcing portion 12, and a support portion 13. The front cover portion 2 includes a window of a portable communication device (not shown). The actuator 11 is attached to the reinforcing portion 12 to deliver vibration to the front cover portion 2. The reinforcing portion 12 is attached to the lower transparent electrode layer 3b of the touch sensor unit 3 such that the actuator 11 is attached to the reinforcing portion 12 and is inserted into and coupled to the support portion 13. The support portion 13 is provided in the substrate 4 such that the support portion 13 allows the actuator 11 to be inserted and coupled thereto and supports the actuator 11 in such a way to deliver the vibration to the front cover portion 2.

Figure 5:
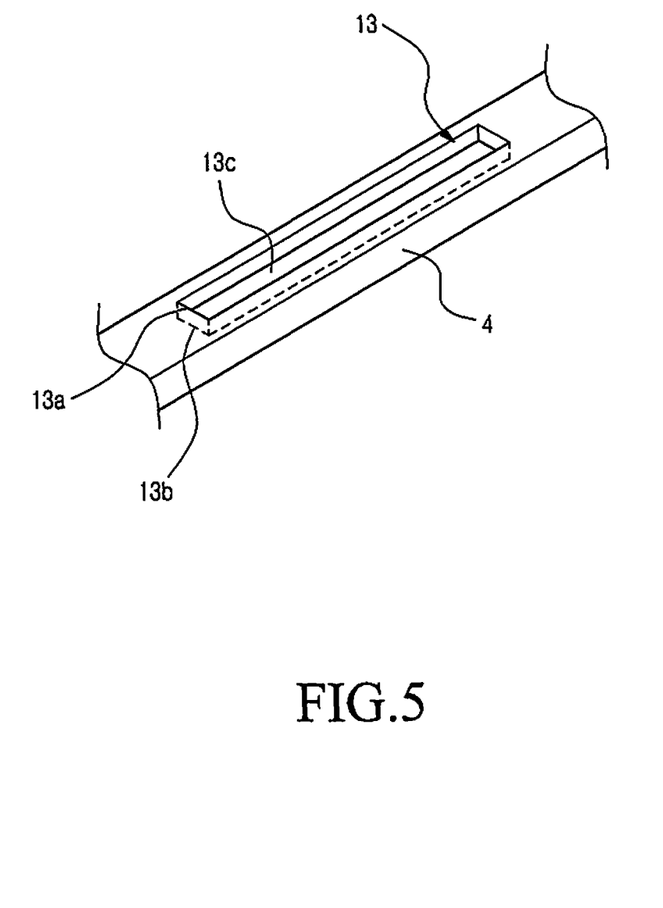
FIG. 5 is an exploded perspective view of a support portion of the touch panel device according to the first embodiment of the present invention.
Figure 6:
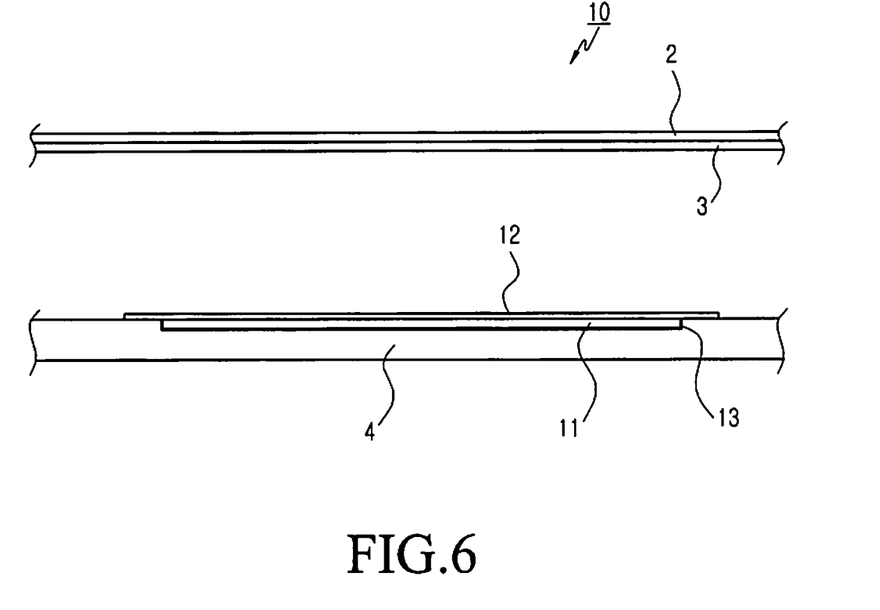
FIG. 6 is a side view showing a state before the touch panel device according to the first embodiment of the present invention is attached to a portable communication device.
Figure 7:
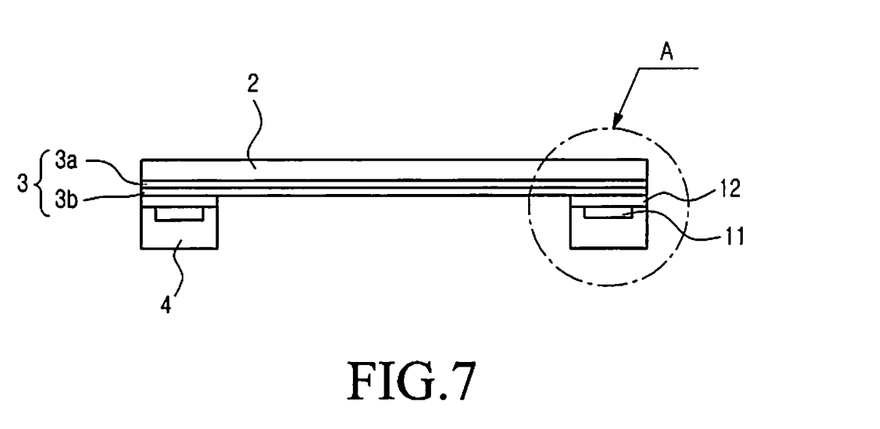
FIG. 7 is a side cross-sectional view showing a state where the touch panel device according to the first embodiment of the present invention is attached to the portable communication device.
Figure 8:
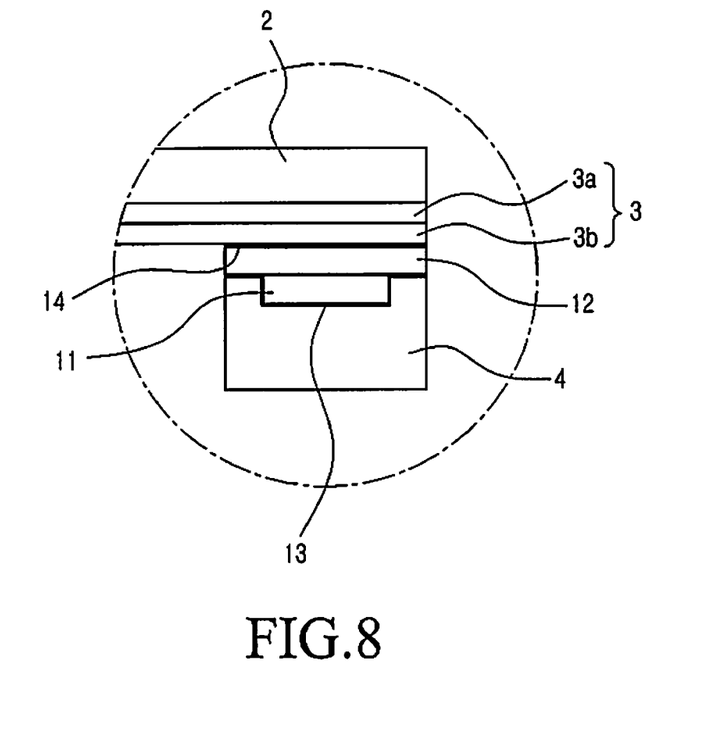
FIG. 8 is an enlarged side cross-sectional view of a portion A of FIG. 7.
Figure 9:
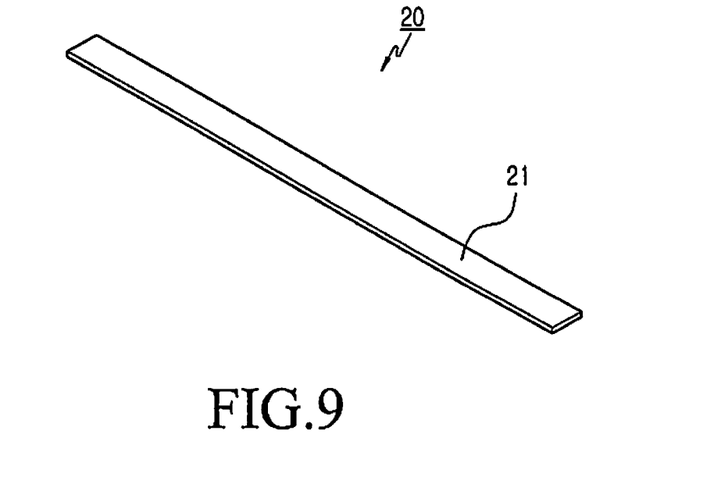
FIG. 9 is a perspective view of an actuator of a touch panel device according to a second embodiment of the present invention.

As shown in FIG. 5, a first side 13a of the support portion 13 is provided with an opening 13c through which the vibration of the actuator 11 is directly delivered to the front cover portion 2. A second side 13b of the support portion 13 is closed to minimize the vibration delivered to the portable communication device itself.

The reinforcing portion 12 is preferably made of a metallic material, a synthetic resin material, or the like.

As shown in FIGS. 2 through 8, the reinforcing portion 12 is attached to the actuator 11 on a first surface thereof by using an adhesive, a double-sided tape 14, etc., and is attached to the touch sensor unit 3 on a second surface thereof by using the adhesive or the double-sided tape 14. For attachment to the actuator 11 and the touch sensor unit 3, the reinforcing portion 12 uses the adhesive, the double-sided tape 14, or other adhesives.

The actuator 11 is preferably a piezoelectric actuator, but may be any type of actuator, such as a piezoelectric ceramic actuator.

As shown in FIGS. 4 through 8, the reinforcing portion 12 is attached to an edge of the touch sensor unit 3 to be included in a dead zone of the display unit (not shown) of the portable communication device.

As shown in FIGS. 5 through 8, the support portion 13 includes a recessed groove for allowing the actuator 11 to be coupled thereto. The support portion 13 is provided at an edge of the substrate 4 to include the actuator 11 in the dead zone of the display unit (not shown) of the portable communication device.

According to the first embodiment of the present invention, the touch panel device 10 includes the front cover portion 2, the touch sensor unit 3 divided into the upper transparent electrode layer 3a and the lower transparent electrode layer 3b, the substrate 4 including the display unit (not shown), the actuator 11, the reinforcing portion 12, and the support portion 13. As shown in FIG. 4, the front cover portion 2 includes the window of the portable communication device (not shown), and the touch sensor unit 3 is attached onto a bottom surface of the window.

The actuator 11 is attached to the first surface of the reinforcing portion 12 by using the adhesive, the double-sided tape 14, or the like. In this state, the actuator 11 is inserted into and coupled to the support portion 13 formed in the substrate 4 and the lower transparent electrode layer 3b of the touch sensor unit 3 is attached to the second surface of the reinforcing portion 12. At the same time, as shown in FIG. 4, the window and the touch sensor unit 3 are attached to the substrate 4.

The support portion 13 includes the recessed groove for allowing the actuator 11 to be coupled thereto, and is preferably provided at the edge of the substrate 4. The actuator 11 is inserted into and coupled through the opening 13c of the support portion 13, thus being included in the touch panel device 10 without a separate mounting space being required.

In this state, if a user touches the front cover portion 2 by using a finger tip or a stylus pen (not shown), the vibration of the actuator 11 is delivered to the finger tip or the stylus pen (not shown).

At this time, the vibration of the actuator 11 is directly delivered to the front cover portion 2 through the opening 13c provided in the first side 13a of the support portion 13, thereby improving the haptic function of the portable communication device. Moreover, the vibration is not delivered downward from the support portion 13 by reducing the vibration force delivered to the closed second side 13b, thus preventing the user from experiencing an unpleasant feeling.

With reference to FIGS. 9 through 14, according to a second embodiment of the present invention, the touch panel device 20 includes the front cover portion 2, the touch sensor unit 3 divided into the upper transparent electrode layer 3a and the lower transparent electrode layer 3b, the substrate 4 including the display unit (not shown), an actuator 21, and a support portion 22.

Figure 11:
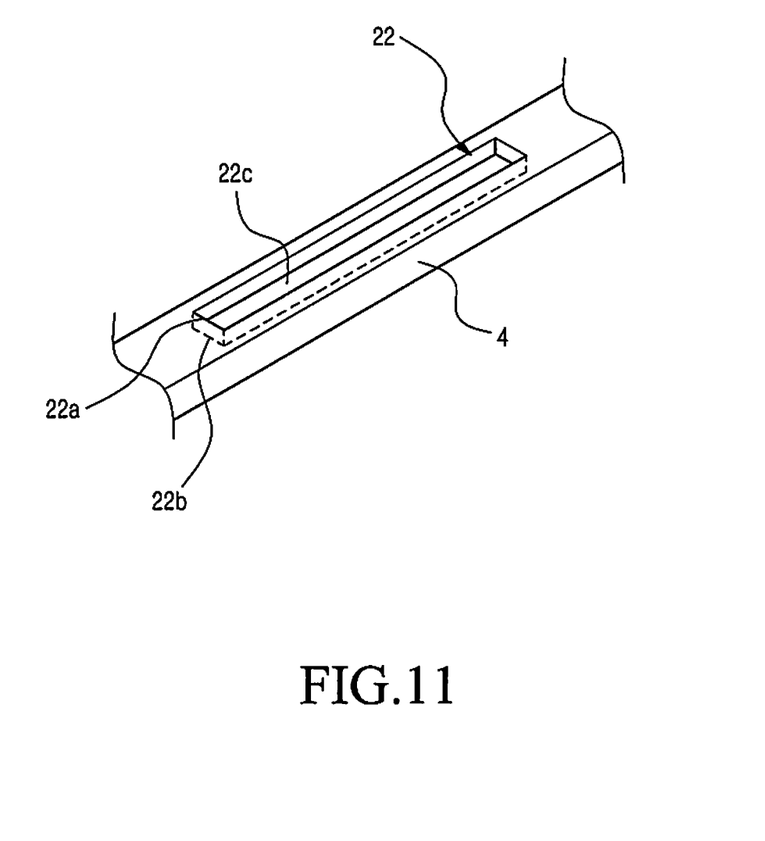
FIG. 11 is an exploded perspective view of a support portion of the touch panel device according to the second embodiment of the present invention.
Figure 12:
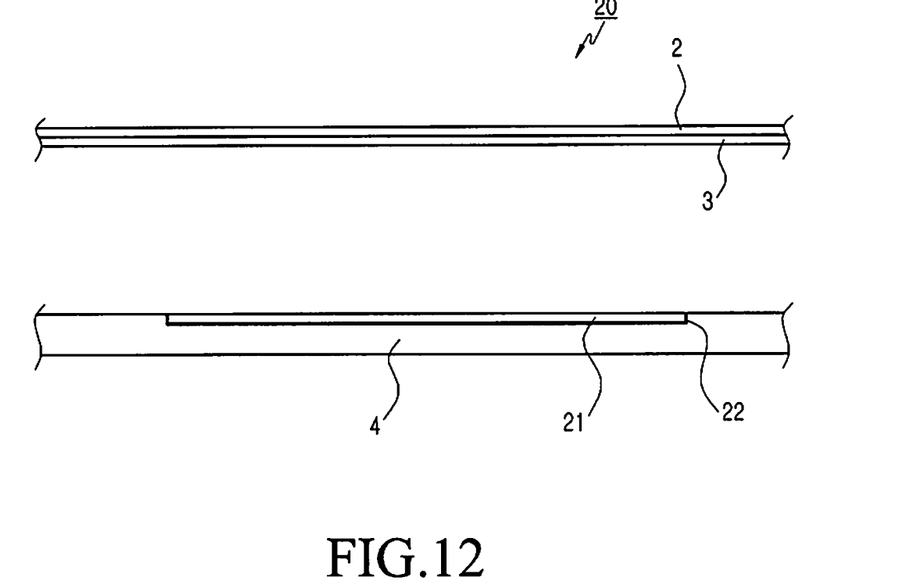
FIG. 12 is a side view showing a state before the touch panel device according to the second embodiment of the present invention is attached to a portable communication device.
Figure 13:
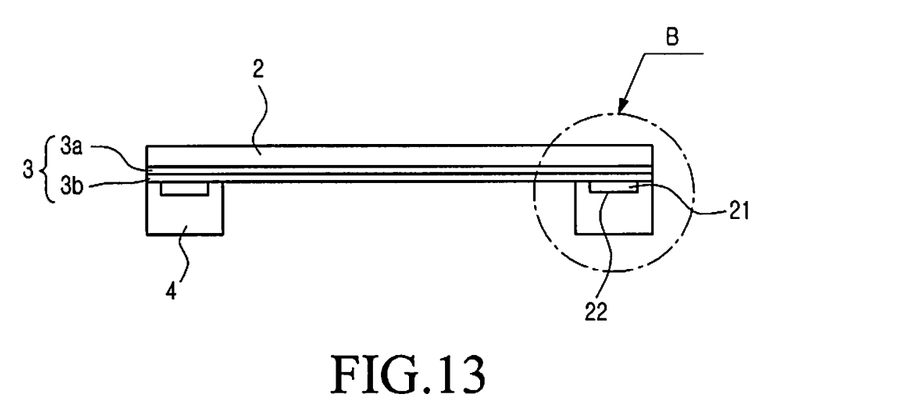
FIG. 13 is a side cross-sectional view showing a state where the touch panel device according to the second embodiment of the present invention is attached to the portable communication device.
Figure 14:
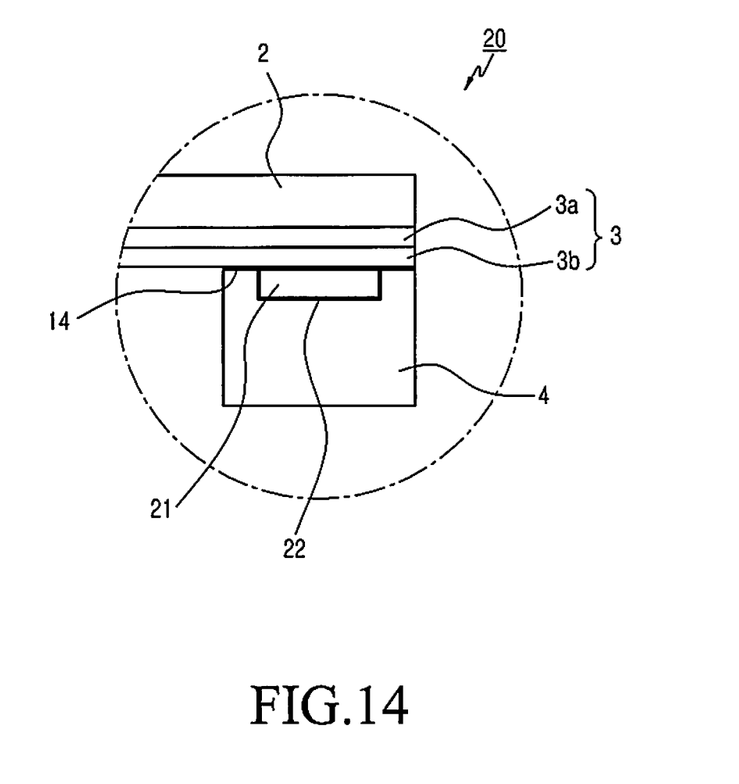
FIG. 14 is an enlarged side cross-sectional view of a portion B of FIG. 13.

The support portion 22 provides an opening 22c in a first side 22a thereof and a closed second side 22b. The actuator 21 is inserted into and coupled through the opening 22c. In this state, the support portion 22 is provided in the substrate 4 such that the support portion 22 supports the actuator 21 in such a way to deliver the vibration of the actuator 21 to the front cover portion 2 through the opening 22c.

As shown in FIGS. 10 through 14, the front cover portion 2 includes a window of the portable communication device (not shown), and the touch sensor unit 3 is attached to a bottom surface of the window, after which the touch sensor unit 3 and the window are attached to the substrate 4.

Figure 10:
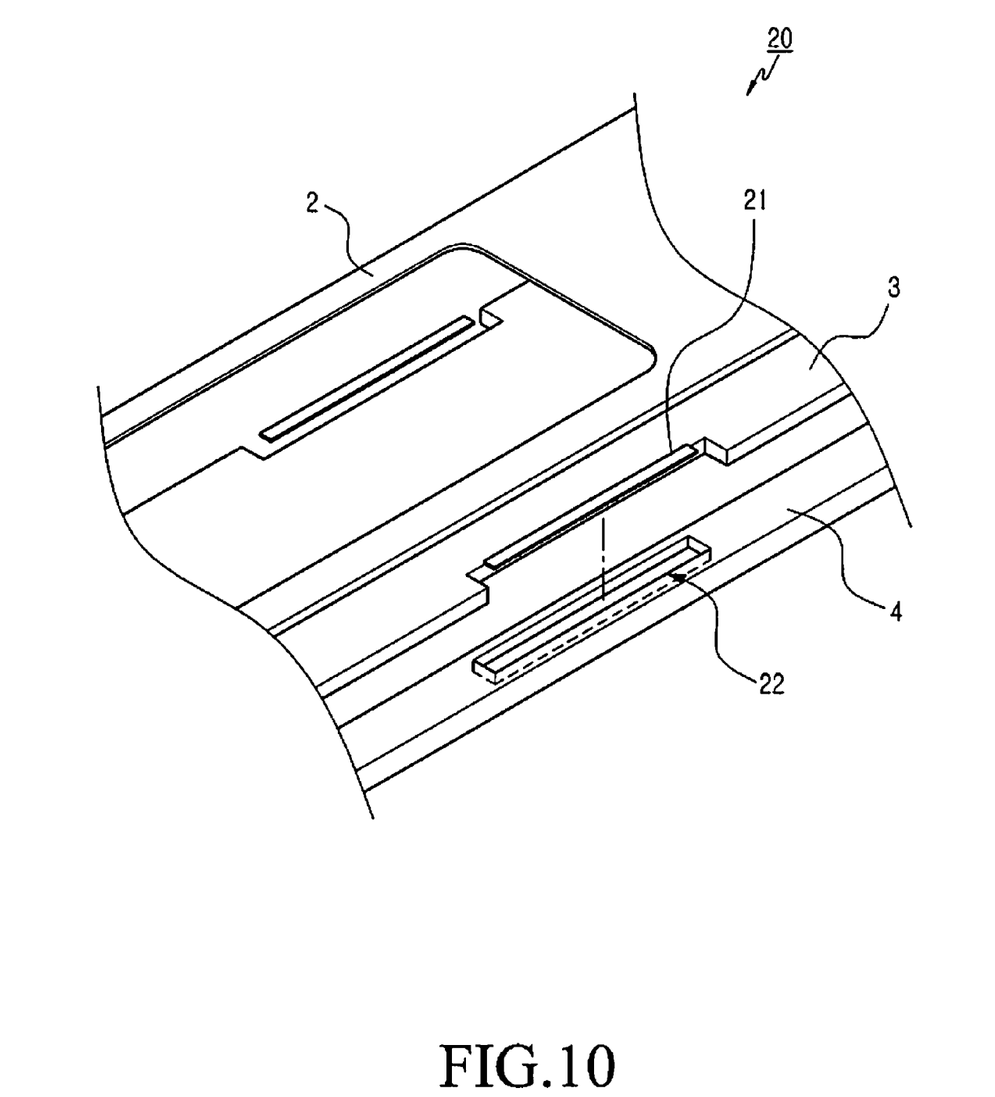
FIG. 10 is an exploded perspective view of the touch panel device according to the second embodiment of the present invention.

In this state, the actuator 21 is preferably attached to an edge of a bottom surface of the lower transparent electrode layer 3b of the touch sensor unit 3 by using an adhesive, a double-sided tape, or the like. At this time, the actuator 21 is coupled to the support portion 22 formed on the substrate 4. The support portion 22 includes a recessed groove for allowing the actuator 21 to be coupled thereto.

As shown in FIGS. 11 through 14, the actuator 21 is inserted into and coupled through the opening 22c of the support portion 22, thus being included in the touch panel device 20 without the need for a separate mounting space.

In this condition, if the user touches the front cover portion 2 by using a fingertip or a stylus pen (not shown), the vibration of the actuator 21 is delivered to the fingertip or the stylus pen (not shown).

At this time, the vibration of the actuator 21 is directly delivered to the front cover portion 2 through the opening 22c provided in the first side 22a of the support portion 22, thus improving the haptic function of the portable communication device. Moreover, the vibration is not delivered downward from the support portion 22 by reducing the vibration force delivered to the closed second side 22b, thus preventing the user from experiencing an unpleasant feeling.

A mobile communication terminal has been used as an example of the portable communication device according to the present invention. However, the portable communication device according to the present invention may be of various types without being limited to the mobile communication terminal.

Examples of the portable communication device according to the present invention may include not only mobile communication terminals operating according to communication protocols corresponding to various communication systems, but also any information communication apparatuses and multimedia apparatuses such as Portable Multimedia Players (PMPs), MP3 players, digital broadcasting players, Personal Digital Assistants (PDAs), smart phones, and so forth, and their application apparatuses.

It would be obvious to those of ordinary skill in the art that the above-described touch panel device according to the present invention is not limited to the foregoing embodiments and drawings, and various substitutions, modifications, and changes may be made therein without departing from the spirit and scope of the invention.

What is claimed is:

1. A touch panel device having a front cover portion, a touch sensor unit divided into an upper transparent electrode layer and a lower transparent electrode layer, and a substrate provided under the touch sensor portion, the touch panel device comprising:
    an actuator for delivering vibration to the front cover portion;
    a reinforcing portion having the actuator attached thereto to attach the actuator to the touch sensor unit; and
    a support portion formed into the substrate, providing an opening in a first side of the substrate and a closed second side opposite the first side, such that the actuator is inserted into and coupled to the opening and the support portion supports the actuator to deliver the vibration of the actuator to the front cover portion by the opening,
    wherein the closed second side reduces the vibration of the actuator.

2. The touch panel device of claim 1, wherein the reinforcing portion is made of one of a metallic material and a synthetic resin material.

3. The touch panel device of claim 1, wherein a first surface of the reinforcing portion is attached to the actuator by using one of an adhesive and a double-sided tape, and a second surface thereof is attached to the touch sensor unit by using one of the adhesive and the double-sided tape.

4. The touch panel device of claim 1, wherein the actuator is a piezoelectric actuator.

5. The touch panel device of claim 1, wherein the reinforcing portion is attached to an edge of the touch sensor unit and a bottom surface of the lower transparent electrode.

6. The touch panel device of claim 1, wherein the support portion comprises a recessed groove for allowing the actuator to be coupled thereto and is provided at an edge of the substrate.

7. The touch panel device of claim 1, wherein the support portion directly delivers the vibration of the actuator to the front cover portion through the opening of the support portion.

8. A touch panel device having a front cover portion, a touch sensor unit divided into an upper transparent electrode layer and a lower transparent electrode layer, and a substrate provided under the touch sensor portion, the touch panel device comprising:
    an actuator attached to a bottom surface of the touch sensor unit to deliver vibration to the front cover portion; and
    a support portion formed into the substrate, providing an opening in a first side of the substrate and a closed second side opposite the first side, such that the actuator is inserted into and coupled to the opening and the support portion supports the actuator to deliver the vibration of the actuator to the front cover portion by the opening,
    wherein the closed second side reduces the vibration of the actuator.

9. The touch panel device of claim 8, wherein the actuator is attached to an edge of a bottom surface of the lower transparent electrode of the touch sensor unit by using one of an adhesive and a double-sided tape.

10. The touch panel device of claim 8, wherein the support portion comprises a recessed groove for allowing the actuator to be coupled thereto and is provided at an edge of the substrate.

11. The touch panel device of claim 8, wherein the support portion directly delivers the vibration of the actuator to the front cover portion through the opening of the support portion.

\* \* \* \* \*